(12) United States Patent
Nolte et al.

(10) Patent No.: US 8,004,757 B2
(45) Date of Patent: Aug. 23, 2011

(54) SAFETY SYSTEM FOR A LASER RADIATION DEVICE

(75) Inventors: Andreas Nolte, Mengershausen (DE); Hubert Wahl, Stadtrode (DE); Klaus Becker, Breitenworbis (DE)

(73) Assignee: Carl Zeiss Microimaging GmbH, Jena (DE)

( * ) Notice: Subject to any disclaimer, the term of this patent is extended or adjusted under 35 U.S.C. 154(b) by 1064 days.

(21) Appl. No.: 11/664,448

(22) PCT Filed: Sep. 14, 2005

(86) PCT No.: PCT/EP2005/009900
§ 371 (c)(1),
(2), (4) Date: Apr. 2, 2007

(87) PCT Pub. No.: WO2006/037439
PCT Pub. Date: Apr. 13, 2006

(65) Prior Publication Data
US 2010/0265573 A1    Oct. 21, 2010

(30) Foreign Application Priority Data
Oct. 4, 2004   (DE) .......................... 10 2004 048 229

(51) Int. Cl.
G02B 21/00   (2006.01)
(52) U.S. Cl. ............................................ 359/368; 372/9
(58) Field of Classification Search ........................ None
See application file for complete search history.

(56) References Cited

U.S. PATENT DOCUMENTS

| 4,549,787 A * | 10/1985 | Tanner ........................... 359/889 |
| 5,535,052 A | 7/1996 | Jörgens |
| 5,714,967 A * | 2/1998 | Okamura et al. .................. 345/8 |
| 2001/0021295 A1* | 9/2001 | Yoshida ........................... 385/88 |
| 2002/0097488 A1 | 7/2002 | Hay et al. |
| 2004/0079894 A1* | 4/2004 | Graefenhain ............... 250/458.1 |
| 2004/0125438 A1 | 7/2004 | Studer et al. |

FOREIGN PATENT DOCUMENTS

| DE | 43 23 129 A1 | 2/1994 |
| DE | 101 57 893 A1 | 6/2003 |
| EP | 1 227 356 A2 | 7/2002 |

* cited by examiner

*Primary Examiner* — Lee Fineman
(74) *Attorney, Agent, or Firm* — Patterson Thuente Christensen Pedersen P.A.

(57) ABSTRACT

A laser radiation-guiding device including: a laser including a control unit; ports for connection of one module each, it being possible that laser radiation may exit at the ports. The device further can include joining part sensors respectively assigned to a port and whose electrical condition depends on whether a predetermined joining part is spaced apart from the respective port by less than a maximum distance in a predetermined orientation relative to the respective port, and an evaluating unit connected to the joining part sensors via a signal link that detects the electrical conditions of the joining part sensors and, depending on the detected conditions, emits a control signal to the control unit of the laser or to a laser radiation-blocking unit, by which emission of eye-damaging laser radiation to the ports of the device can be prevented inhibited.

20 Claims, 9 Drawing Sheets

SAFETY SYSTEM FOR A LASER RADIATION DEVICE

FIELD OF THE INVENTION

The present invention relates to a laser radiation-guiding device, to means for protecting a user of such device from laser radiation unintentionally exiting from said device and to a method of protecting a user of a laser radiation-guiding device from laser radiation unintentionally exiting therefrom.

BACKGROUND OF THE INVENTION

In science and technology, increasing use is being made of laser radiation-guiding devices, which—in connection with the present invention—are generally understood to be devices through which or through the housing of which at least a portion of a beam path for laser radiation from a laser of the device extends. The laser radiation-guiding devices need not comprise any special optical elements to guide or deflect the laser radiation, although this is often the case.

An example of such devices are microscopes provided with lasers. For example, laser-scanning microscopes are used in the field of confocal microscopy, and TIRF systems, i.e. systems employing so-called "Total Internal Reflection Fluorescence", are used in the field of wide field microscopy. The lasers used therein are characterized by ever-increasing energy densities, so that some of these lasers are classified in laser classes of greater than 3.

Since the radiation of lasers in laser classes greater than 3 is considered to be very dangerous for the eyes, the eyes of users have to be protected against laser radiation that may possibly exit unintentionally from such laser radiation-guiding device.

This is not necessarily a problem with self-contained devices. However, many laser radiation-guiding devices have a modular design which allows predetermined modules of the optical system to be changed by a user. Modules provided in the sense of the invention for a laser radiation-guiding device are elements or units, in particular of an optical system of the device, which can be connected or attached, depending on their design, to the device or to a basic unit of the device and/or to further modules by a user. Typical examples of such devices include modern microscopes which are usually of a modular design. In many cases, these microscopes allow a user to change, attach or detach modules, which are designed for use with said microscopes, according to requirements given by a particular application.

This purpose is served by so-called ports and which, in connection with the present invention are generally understood to be connections to a laser radiation-guiding device and/or to a module for attachment to the device, which ports are provided to enable or allow a user to connect or disconnect corresponding modules to/from them and which are optically connected to the beam path of the laser radiation in the device. In this case, an "optical connection" means that laser radiation can enter into or exit from said connection directly or deflected by bodies appearing intentionally or unintentionally in the portion of the laser radiation's beam path within the device. In addition to these ports provided for use by a user, other connections may also be provided, which are either factory-sealed or to which only service personnel is able or is allowed to connect modules. Such connections may comprise, for example, mounting means to which modules are attachable only by using special tools or at which the mounting devices are sealed. In the following, these connections will be treated as parts of the laser radiation-guiding device and shall not to be mentioned any further.

There may be safety problems related to the attachment or detachment of modules at the ports. In the case of careless or negligent handling of the modules or of the device, in particular after attachment or detachment of a module, it is possible that laser radiation may exit from one of the ports under unfavorable circumstances. For example, if the user forgets to close the port again after detaching a module, laser radiation may exit under certain circumstances during subsequent operation and endanger a user.

Several counter-measures are known to prevent such dangers. The most simple measure consists in the instruction manual warning the user to check the ports before commencing operation after attachment or detachment of modules.

Better protection is provided by warning signs at the ports, warning the user of the danger. However, this does not allow to exclude neither gross negligence by the user nor deliberate disregard of the warning and a danger resulting therefrom.

A further possibility of reducing such danger may consist in blocking the ports actually provided for use by a user such that a user cannot himself change a module connected thereto. However, this measure eliminates exactly the advantages of a modular design.

A further known solution is a safety shutdown device. EP 1227356 A1 describes a microscope which has a identifying device for detecting whether an element is inserted in an objective holder of the microscope. The identifying device is connected to a blocking unit by which the electromagnetic radiation emitted by a source of illumination can be interrupted if no element is arranged in the objective holder. In particular, the identifying device may comprise a microswitch actuated when screwing the objective into the objective holder. However, this solution has the disadvantage that it only represents an individual solution concerning the objective holder.

Further, refitting existing microscopes at acceptable costs does not seem easily possible.

It is an object of the present invention to provide means for protecting a user of a laser radiation-guiding device from laser radiation unintentionally exiting from said device, and to provide a device equipped with said means and giving better protection to a user of the device against laser radiation unintentionally exiting from said device. Further, a method is to be provided for protecting a user of a laser radiation-guiding device against laser radiation unintentionally exiting from said device.

The object is achieved by a method of protecting a user of a laser radiation-guiding device, which comprises at least two ports for connection of modules, in particular of a microscope, from laser radiation unintentionally exiting from the device, by monitoring whether a module is connected to each port, and if it is detected that this is not the case, preventing the emission of eye-damaging laser radiation at the ports.

The object is achieved by a laser radiation-guiding device, in particular a microscope, which comprises: a laser with a control unit for controlling the laser; at least two ports for connection of one module each, it being possible that laser radiation may exit at the ports; and at least two counter piece detecting sensors respectively assigned to one of the ports, the electrical condition of said sensors respectively depending on whether a predetermined counter piece is located within a maximum reach of the respective port in at least one predetermined orientation relative to the respective port; at least one evaluating unit connected to the at least two counter piece detecting sensors via a signal link, which evaluating unit detects the electrical conditions of the counter piece detecting sensors and, depending on the detected conditions, emits a control signal to the control unit of the laser or to a laser radiation-blocking unit, by means of which emission of eye-damaging laser radiation at the ports of the device can be prevented, with the control unit of the laser and/or the blocking unit being connected to and controllable by the evaluating unit of the safety system. The method of the invention can be carried out by the device according to the invention.

The laser radiation-guiding device already defined in more detail above comprises the laser with a control unit for the laser. The laser may be selected as desired. The laser radiation of the laser is guided in the laser radiation-guiding device along a laser beam path which may be optionally divided up into branches in which the laser radiation is then attenuated to a greater or lesser extent. The control unit of the laser is understood to be a unit which controls the radiation power emitted by the laser, i.e. which can switch the laser on or off or which may possibly modify the power output of said laser.

The invention enables protection of a user from laser radiation exiting from the ports already defined in more detail above. This is done by automatically checking whether said ports are in a safe condition, i.e. in particular whether said ports have modules connected to them by which any unintentional emission of eye-damaging laser radiation to the port is prevented. If this is not the case for any of the ports, the emission of eye-damaging laser radiation into the ports is prevented. Eye-damaging laser radiation is understood herein to be laser radiation having an intensity which may cause damage to the human eye. This particularly refers to laser radiation having an intensity which may be emitted with maximum intensity by lasers of the laser classes greater than 3.

The counter piece detecting sensors and the counter pieces are provided for automatic control of the ports of the laser radiation-guiding device, with one counter piece sensor and counter piece each being assigned to a port, or to a port and a module connected thereto, respectively. Advantageously, a counter piece is arranged on a module and a counter piece sensor is arranged at least in the vicinity of the corresponding port, although this arrangement may also be effected inversely.

A counter piece comprises a detectable region which is detected by a counter piece detecting sensor when the counter piece and thus the detectable region is located less than a maximum distance from the counter piece sensor in a predetermined orientation, due to the electrical condition of the counter piece detecting sensor reaching a predetermined condition. In this case, the maximum reach depends on the type and range or sensitivity, respectively, of the counter piece detecting sensor sensing the detectable region. The counter piece needs to enable the approximation to the counter piece detecting sensor and the influence on the electrical condition of the counter piece detecting sensor only in a predetermined orientation relative to the counter piece detecting sensor; preferably, such approximation and influence are also possible in several orientations. The counter piece is preferably attached to or provided on a module as defined above such that the identifying device is detectable by the counter piece detecting sensor only if the module is correctly attached to the port.

Proper and, thus, safe sealing of a port against laser radiation exiting from the device may, therefore, be detected in that the counter piece detecting sensor detects the detectable region of the corresponding counter piece and assumes a corresponding electrical condition. The predetermined electrical condition may be given, for example, by a value of a corresponding parameter or even by an entire range of values.

The evaluating unit, which may consist of an electric, possibly highly integrated, non-programmable circuit or may preferably comprise a programmable microprocessor connected to corresponding interfaces, serves to detect the electrical conditions of the counter piece detecting sensors.

If at least one of the counter piece detecting sensors detects no counter piece, i.e. if a correct connection is not recognized via the corresponding electrical condition of at least one of the counter piece detecting sensors for a port, the emission of eye-damaging laser radiation from the ports is prevented. To this end, it is sufficient to reduce the intensity of the laser radiation appearing in the region of the ports, e.g. by absorption, beam expansion or partial deflection, to such an extent that a danger for the eye is no longer given; preferably, the laser radiation is blocked completely. For this purpose, the control unit of the laser may be controlled by the evaluating unit, or the laser radiation blocking unit, which is optionally present in the device, may be actuated, which blocking unit may be located anywhere in the beam path between the laser and the ports and by which an emission of eye-damaging laser radiation into the ports of the device can be prevented. The blocking unit only needs to be able to sufficiently attenuate the laser radiation upon actuation; preferably, however, it will then block the laser radiation completely.

In accordance with the invention, reference is made, for the sake of simplicity, to a blocking condition of the blocking unit if said unit attenuates the laser radiation at least to such an extent that a danger for the eyes is no longer present. Therefore, the evaluating unit is preferably provided such that the emitted control signal is a signal which turns off the laser or puts the blocking unit in the condition blocking the laser radiation if at least one of the counter piece detecting sensors detects no counter piece. This ensures that, upon the occurrence of even just one hazardous spot, the emission of eye-damaging laser radiation into the ports of the laser radiation-guiding device can be prevented.

Moreover, the invention enables comprehensive protection of a user of a laser radiation-guiding device by monitoring at least two ports that appear to be relevant, and not just one single location on the device. In doing so, the fact may also be used that ports of modular devices often have the same dimensions, so that the monitoring of different ports is possible by providing the same means for monitoring and, thus, in a simple manner.

It is sufficient, in principle, if the counter piece detecting sensors are integrated directly into the device or into a basic unit of the device, respectively, which may be a stand or a housing in the case of a microscope, for example. However, in many cases laser radiation-guiding devices, in particular microscopes, have a long service life so that a possibility of upgrading would be desirable.

For this purpose, the invention provides an attachment for a laser radiation-guiding device, in particular for a microscope, said attachment comprising: a mounting unit for mounting the attachment to the laser radiation-guiding device and at least one counter piece detecting sensor, whose electrical condition depends on whether a predetermined counter piece is spaced apart from the attachment by less than a maximum distance in at least one predetermined orientation relative to the attachment. The counter piece detecting sensors of the attachments according to the invention and the counter piece detecting sensors incorporated directly into the device according to the invention need not differ, so that all preferred further embodiments described below of the attachment according to the invention with respect to the nature of the counter piece detecting sensors and their position in an attachment also apply accordingly to those counter piece detecting sensors of the device according to the invention that are mounted directly to the device. The maximum distance used in connection with the attachment may differ from the maximum distance used in connection with the counter piece detecting sensor, although both distances depend on each other in the case of an attachment.

Further, the invention provides a counter piece for an attachment according to the invention, which counter piece comprises at least one identifying device influencing the electrical condition of the counter piece detecting sensor of the attachment when the counter piece is spaced apart from the attachment by less than the maximum distance in the predetermined orientation relative to the attachment. The counter pieces according to the invention perform the same function as the counter pieces described in connection with the laser radiation-guiding device, so that the statements made in connection with the laser radiation-guiding device according to the invention also apply to the counter pieces according to the invention. In particular, the counter pieces according to the invention for the attachments may preferably also serve as counter pieces for counter piece detecting sensors directly incorporated into the laser radiation-guiding device according to the invention. The counter pieces according to the invention are provided as counter pieces for the attachments according to the invention such that, in particular, the identifying devices of said counter pieces and the counter piece detecting sensors are adapted to each other with regard to their designs and positions relative to the counter piece or to the attachment, respectively. The orientation and the maximum distance for influencing the electrical condition of the counter piece detecting sensor are respectively determined by the design of the counter piece detecting sensor and its arrangement in the attachment on the one hand, and by the design of the identifying device on the other hand. The attachment is mounted to the device or to a module in a manner allowing the detection of a counter piece to be interpreted such that a corresponding module is connected to the port.

The attachments may be attached to the laser radiation-guiding device or to a module of the latter, thus allowing to provide a laser radiation-guiding device in which at least one of the counter piece detecting sensors is a counter piece detecting sensor of an attachment according to the invention arranged at one of the ports. This enables refitting, so that older devices can also be made safer through counter piece detecting sensors, counter pieces and an evaluating unit. Moreover, the use of attachments according to the invention also in manufacturing new laser radiation-guiding devices may be simpler than directly attaching counter piece detecting sensors, because already existing constructions, for example, of basic units, such as microscope stands, need not be modified, but can simply be supplemented. Particularly simple production of a laser radiation-guiding device according to the invention is achieved if all counter piece detecting sensors are counter piece detecting sensors of attachments according to the invention which are respectively arranged at the ports of the device.

Further, the invention provides a safety system designed for a laser radiation-guiding device, in particular a microscope, said system comprising: at least two attachments according to the invention and at least one evaluating unit connected to the at least two attachments via a signal link, which evaluating unit detects the electrical conditions of the counter piece detecting sensors and, depending on the detected conditions, emits a control signal to a control unit of a laser for the device or to a laser radiation-blocking device.

The safety system according to the invention comprises an evaluating unit which corresponds to the laser radiation-guiding device according to the invention so that, unless explicitly stated otherwise, any statements relating to the evaluating units apply to both the laser radiation-guiding device according to the invention and the safety system of the invention. By providing an already existing laser-carrying device with a safety system according to the invention, very good protection of users of the device can be achieved without causing high expenditure or high costs.

Therefore, the safety system and, in particular, the evaluating unit is preferably provided such that the emitted control signal is a signal which switches off the laser or switches the blocking unit into a condition blocking the laser radiation if at least one of the counter piece detecting sensors senses no counter piece. This ensures that, upon the occurrence of even just one hazardous spot, the emission of eye-damaging laser radiation into the laser radiation-guiding device can be prevented.

It is basically sufficient to make only those ports safe which present the greatest potential danger. Particularly good protection of users from laser radiation is obtained, however, if at least one counter piece detecting sensor is provided for all ports in the laser radiation-guiding device of the invention, which sensor is connected to the evaluating unit via a signal link. The counter piece detecting sensor may be provided at an attachment at one of the ports intended to be used by the user or may also be held directly to the laser radiation-guiding device.

Detection of a port for which no counter piece has been detected by the counter piece detecting sensor present there may cause the laser to be switched off completely or at least cause its output power to be reduced. Alternatively or additionally, the blocking device preferably comprises a shutter which is arranged preceding the ports and is controlled by the evaluating unit of the safety system, said shutter being closed if any of the counter piece detecting sensors connected to the evaluating unit detects no counter piece. Such shutter arranged in the beam path of the laser radiation between the laser and the ports may be arranged, in the case of a microscope, particularly in the stand of the latter directly following a connection or port for connecting a laser module, which allows to connect any laser modules whatsoever to the microscope.

In order to achieve optimal protection, the combination of attachments and counter pieces is selected such that an object entering the region of the attachment by coincidence is not simply recognized as a counter piece.

In principle, any sensors allowing to detect the presence of objects in their vicinity may serve as counter piece detecting sensors. For example, optical, capacitive or ultrasound sensors may be used. Particularly great safety against interferences caused, for example, by ambient light is obtained if the attachment according to the invention is provided with a mechanical feeler as the counter piece detecting sensor, said feeler being actuated by at least a portion of the counter piece. The electrical condition of the counter piece detecting sensor detected by the evaluating unit may then be the conductivity of said sensor. The identifying device of the counter piece may be provided by a corresponding portion of its surface. The counter piece preferably comprises a flat surface portion which, upon rotation of the counter piece relative to the attachment, is supported—in an otherwise unchanged relative position to the attachment—on an actuating element of the feeler and thus actuates the latter in various orientations.

In order to be able to avoid a purely coincidental actuation of the feeler, a free end of an actuating element of the feeler is preferably located in a recess of the attachment according to the invention. The identifying device of the corresponding counter piece according to the invention then preferably comprises at least one protrusion which actuates the feeler when the counter piece is spaced apart from the attachment by less than the maximum distance in the predetermined orientation relative to the attachment.

A further embodiment of the attachment according to the invention comprises as the counter piece detecting sensor, two electrical contacts which are electrically connectable to each other by a predetermined, electrically conductive region of the counter piece. The identifying device of the corresponding counter piece according to the invention then preferably comprises at least one electrically conducting protrusion which short-circuits the electrical contacts when the counter piece is spaced apart from the attachment by less than the maximum distance in the predetermined orientation relative to the attachment. This type of counter piece detecting sensor has a particularly simple structure and can, therefore, have a particularly long service life.

In the counter pieces of the two last-described embodiments, the protrusion forming the identifying device may be formed, in particular, by a pin. Said pin may be embedded in a corresponding bore of a basic body of the counter piece. The pin is preferably made of metal.

In a further embodiment of the attachment according to the invention, a sensor responding to magnetic fields is provided as the counter piece detecting sensor. Although it is possible to use any kind of sensors responding to magnetic fields, e.g. magneto-resistive or GMR ("giant magnetic resistance") sensors, the counter piece detecting sensor is preferably a Hall sensor. In Hall sensors, the electrical condition used is represented by the value of the Hall voltage generated upon occurrence of a magnetic field in the Hall sensor. For use with counter piece detecting sensors responding to magnetic fields, the identifying device of a corresponding counter piece according to the invention preferably comprises a magnet.

In another preferred embodiment of the attachment according to the invention, a transceiver unit comprising an antenna for recognition of at least one predetermined transponder is provided as the counter piece detecting sensor. The counter piece according to the invention then preferably comprises a transponder, which is provided, in particular, for operation with the transceiver unit of the attachment according to the invention. Suitably arranging the antenna at the attachment and the transponder at the counter piece may have the effect that the transponder is recognized only if the counter piece is properly positioned relative to the antenna and, thus, to the attachment. This embodiment offers the further advantage that the type of the counter piece can be identified automatically by the transceiver unit, if the transponder has a corresponding identification that can be scanned. The identification data can be transmitted to the evaluating unit or to another control unit of the laser radiation-guiding device. In particular, RFID technology may be used, in which case the transponder is an RFID component or what is called an "RFID tag", and the transceiver unit with its antenna forms a corresponding reading device.

For some modules, it may turn out to be necessary to rotate them to various positions during installation. It may be necessary, particularly in the case of microscopes as laser radiation-guiding devices, to rotate the module to a suitable position when mounting it. Therefore, the magnet of the counter piece is preferably ring-shaped. Regardless of its angular position, the magnet functioning as the identifying device may then be detected by a corresponding counter piece detecting sensor.

An attachment according to the invention principally needs to comprise only one counter piece detecting sensors. However, it is preferred to provide at least two counter piece detecting sensors. These sensors may be designed identically or differently. According to a first alternative, the counter piece detecting sensors may both be simultaneously connected to the evaluating unit, which is then provided such that a counter piece is considered to be detected only if both counter piece detecting sensors simultaneously detect corresponding parts of the identifying device of the same counter piece. This means that the evaluating unit is provided such that it recognizes the presence of a counter piece only if a predetermined pattern of electrical conditions of the counter piece detecting sensors is detected. When using counter piece detecting sensors that differ from each other, corresponding counter pieces are required whose identifying devices comprise parts corresponding to the counter piece detecting sensors. Therefore, they cannot simply be replaced by other objects, which strongly reduces a risk of tampering.

According to a second alternative, the counter piece detecting sensors may also be arranged in different places on the attachment, in which case the evaluating unit is then preferably provided such that it recognizes the presence of a counter piece when at least one of the counter piece detecting sensors assumes a corresponding electrical condition. This makes it possible to mount a counter piece in different positions relative to the attachment, while the counter piece is still detectable by at least one of the counter piece detecting sensors.

In order to detect the electrical condition of the counter piece detecting sensors, the latter are connected to the evaluating unit via signal links. A particularly simple and interference-free connection is obtained if the attachment according to the invention comprises terminals connected to the counter piece detecting sensor for signal lines to an evaluating unit. In the safety system according to the invention, the attachment and the evaluating unit are then connected via a line.

If multiple attachments are used, the corresponding number of lines may be a hindrance to working with the laser radiation-guiding device, in particular a microscope. Moreover, the layout and mounting of the lines may require considerable expenditure. Therefore, in the safety system according to the invention, at least one attachment comprises a radio transmission unit connected to the counter piece detecting sensor, and the evaluating unit comprises a corresponding radio reception unit, so that the signal link between the attachment and the evaluating unit is radio-based. For this purpose, the counter piece detecting sensor of the attachment according to the invention is connected, in particular, to a radio transmission unit by which a signal may be emitted which represents the electrical condition of the counter piece detecting sensor. In doing so, basically any radio frequencies whatsoever can be used. The transmission and the reception unit or the radio interface are adapted for use of frequency bands that are approved for general use. Particularly preferably, the transmission and reception units or the radio interface, respectively, comply with the "bluetooth" standard.

In principle, it is sufficient for data transmission to be effected only from the counter piece detecting sensor to the evaluating unit. However, both the attachment and the evaluating unit preferably comprise a transmission and reception unit allowing to establish a bidirectional communication between them.

The attachments comprise the mounting unit for mounting to the laser radiation-guiding device or to a port of a module. Said mounting unit may basically have any suitable design. The mounting unit may be selected, among other things, depending on the type and design of the port, on the type and design of the mounting of a module to the port and on the space available at the respective port. The mounting unit is preferably provided such that a user can no longer use conventional tooling for non-destructively disconnecting a module attached to the device. In particular, the laser radiation-guiding device according to the invention may be provided—in as many places as possible, preferably at all ports without counter piece detecting sensors directly mounted to the device—with attachments that are mounted to the device in a manner preventing a user from disconnecting them without destruction. Particularly preferably, the evaluating unit is also securely installed at the device and provided so as to allow the device to control a possible electrical power supply for the device and to control modules to be attached to the device. Such laser radiation-guiding device can then not be operated without counter pieces at the ports, thus providing particularly good protection.

In an embodiment of the attachment according to the invention, the mounting unit comprises a surface for firm bonding to a predetermined surface of the laser radiation-guiding device or of a module for the latter, in particular comprising a port. The surface of the attachment is preferably provided such that it also establishes a firm bond with the corresponding surface of the laser radiation-guiding device in the attached position. Therefore, the attachment can be simply glued to the laser radiation-guiding device or firmly bonded thereto in any other way, which may facilitate refitting. The shape and size of the surface may depend, in particular, on the site of attachment to the laser radiation-guiding device. This embodiment is particularly suitable for ports which do not comprise any connecting elements protruding from the surface of the laser radiation-guiding device, such as tubular studs, for example.

As an alternative or in addition to the firmly bonded mounting, the mounting unit of the attachment according to the invention may comprise a hole for a screw or a rivet. A screw or rivet connection may not only withstand great forces, but also allows, particularly when using at least two bolts or rivets, a precise alignment of the attachment on the laser radiation-guiding device. The thread receiving the bolt may be provided in the laser radiation-guiding device. A bolt is also understood herein to include a threaded pin or rod which is securely held on the laser radiation-guiding device.

An attachment held on the laser radiation-guiding device by a screw connection using conventional screws or nuts may be easy to disconnect, in principle, by a user, so that the attachment can be removed from the laser radiation-guiding device. In order to make such tampering at least substantially more difficult, the mounting unit of the attachment according to the invention preferably comprises at least one bolt and/or nut with an encoded tool mount. In this context, a tool mount is understood to be a portion of the screw or nut to which the tool for establishing or loosening the screw connection is applied or into which the tool for establishing or loosening the screw connection is inserted. The code may then consist in unusual dimensioning, e.g. deviating from standardized types of screws, and/or an unusual shape, in particular one which deviates from standards. For example, hexagon socket screws with unusual internal diameters of the hexagonal mount or pentagon socket screws may be used. Moreover, it is also possible to use screws or nuts whose mounts are non-symmetrical.

When the attachment is fixed using a bolt connection, at least one of the nuts or bolts used for mounting of an attachment held to the device is sealed as an alternative or in addition to coding of the laser radiation-guiding device according to the invention. Such sealing, which may be effected, for example, by the use of a lacquer preferably having a conspicuous color, may warn the user on the one hand that he is not allowed to modify such screw connection and on the other hand may allow to prove manipulation of the screw connection by a user.

In particular, when mounting an attachment of the invention to a port comprising a protruding stud, it is preferred that the mounting unit of the attachment comprise a clamping unit for mounting to the laser radiation-guiding device or to a module by means of a clamping connection. Such mounting allows very variable positioning of the attachment on the laser radiation-guiding device and is suitable, in particular, for refitting of microscopes whose ports comprise a tubular or stud-shaped protruding portion to which a module is connected.

Particularly in case the attachment is to be fixed in a simple and secure manner to the laser radiation-guiding device in a predetermined position, it is preferred, as an alternative or in addition to the already described manners of mounting, that the mounting unit comprise a shaped body allowing to establish a firmly bonded connection between the attachment and the laser radiation-guiding device or a module. For example, a port may comprise circumferentially extending edges or ledges that may be used for a firmly bonded connection.

In all alternatives, mounting of the attachment may also be effected, in particular, to a module which itself comprises a port to which a further module may be connected.

The counter piece may be realized as a module for connection to a port of the laser radiation-guiding device or to another module. Alternatively, the counter piece is provided for connection to a module and thus comprises a mounting unit for mounting to a replaceable module for the device. Like the mounting unit of an attachment according to the invention, the mounting unit of the counter piece may preferably comprise a surface for a firm bond to a predetermined surface of the module and/or at least one hole for a bolt or rivet and/or a clamping unit for mounting to the module by means of a clamping connection and/or a shaped body by means of which a firm bond can be established between the counter piece and the module. In this manner, a module can even be refitted later for use with the safety system according to the invention.

If a port is not in use, it has to be closed. For this purpose, it is preferred that a counter piece is provided as closure of a port of the laser radiation-guiding device. This allows simple verification of whether a port provided with an attachment according to the invention is correctly closed or not. Such closure should also be construed as a module in the sense of the invention.

The shape of the attachment according to the invention and of the counter piece according to the invention may depend on the design of the port or of the module to be connected to said port.

Particularly for use with ports comprising a stud which protrudes from the laser radiation-guiding device it is preferred that the attachment, in its condition mounted to the laser radiation-guiding device, enclose part of the laser radiation-guiding device. In this case, the counter piece preferably comprises a ring-shaped reception for a cylindrical part of the module. In particular, the attachment or the counter piece, respectively, may be provided as a retainer which can be fitted onto the port or the module.

For mounting to the port or the module it is then respectively preferred for the attachment or the counter piece according to the invention that it comprise a ring segment and a locking segment which, when assembled and mounted to each other at two locations, form a ring element. The ring element can then enclose the port or a corresponding portion of the module. If the locking segment is releasably connected to the ring segment at both locations, the attachment or the counter piece can be mounted in a simple manner to a port or module even under spatially unfavorable conditions.

However, the locking segment is preferably articulated to the ring segment. For mounting, it may then be folded away from the ring segment first and, after placing the ring segment on the port or the module, it may be rotated into a locking position in which it can be releasably connected to the ring segment at the free end.

If the portion of the port or of the module to which the attachment or the counter piece is being mounted is cylindrical at the free end, particularly simple mounting can be enabled by the ring segment having a segment angle of more than 180°. The ring segment can then be centered already when placing it on the corresponding portion of the port or of the module, without having to actuate the locking segment.

When attaching the attachment to the laser radiation-guiding device, the position of said attachment relative to the device or to the counter piece of the module held on the device has to be set. Such setting is facilitated if the attachment comprises a preferably flat contact surface for a complementary mating surface of the counter piece. Accordingly, the counter piece comprises a mating surface which is complementary to the contact surface of the attachment. In particular, the contact surface and the mating surface may be located next to each other if the counter piece is spaced apart from the attachment by less than the maximum distance at least in the predetermined orientation relative to the attachment. In order to set the position of the attachment on the laser radiation-guiding device or of the counter piece on the module, it is only required to mount the module with the counter piece held thereon to the corresponding port including the attachment. After this, the attachment and the counter piece can be moved towards each other until their contact surface contact each other, following which the attachment or the counter piece, respectively, can be fixed. Conversely, after the attachment and the counter piece have been mounted, the contact surface and the mating surface can be used to assist setting when attaching the module.

The attachment is preferably attached near the port or on it. In order to enable mounting of a module on the port, the attachment preferably comprises a recess for a mounting element for mounting the module to the laser radiation-guiding device, in particular for a screw for mounting a module with a dovetail ring. Particularly preferably the ring-shaped attachment comprises several such recesses so that the attachment is rotatable to different angular positions about the ring axis during mounting.

The use of ports having a predetermined shape may require connection of a module using another module, i.e. an adapter. Particularly for this case, but also for modules which are held on a laser radiation-guiding device following each other along a beam path, the attachment is preferably also provided as a counter piece for a further attachment according to any one of the preceding claims. In particular, the attachment may be provided as an adapter or a module to which at least one further module can be connected.

The invention may be applied in a particularly advantageous manner to laser radiation-guiding devices in the form of microscopes. The microscopes may be any microscopes with ports, which comprise a laser or can be equipped with one.

BRIEF DESCRIPTION OF THE DRAWINGS

The invention will be explained in more detail below, by way of example and with reference to the drawings, wherein.

DETAILED DESCRIPTION

Figure 1:
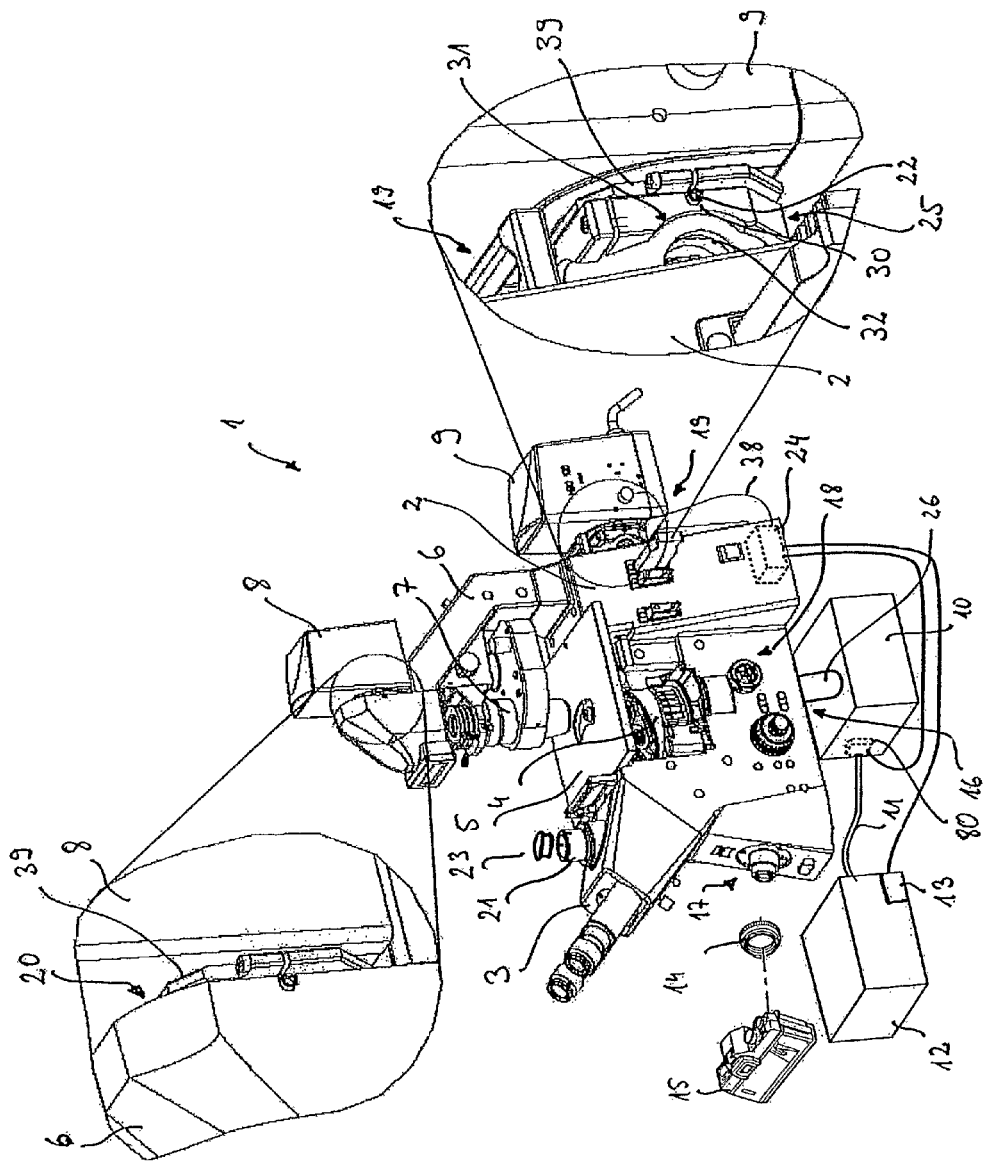
FIG. 1 shows a schematic perspective view of a laser radiation-guiding device according to a preferred embodiment of the invention in the form of a microscope and two enlarged representations of regions with ports.

In FIG. 1, an inverted microscope 1 comprises, as the laser radiation-guiding device according to a preferred embodiment of the invention, a base stand 2 with a binocular tube 3 securely connected during manufacture, an objective turret 4, an object stage 5 and a transmission light arm 6, which is also securely mounted during manufacture and comprises a condenser 7. In terms of modules that can be changed by a user, a halogen lamp 8 is connected to the transmission light arm 6, and a mercury vapor lamp 9, a scanning module 10 to which laser radiation is supplied via a light guide 11 from a laser 12 of the microscope 1 comprising a control unit 13, and a camera adapter 14 with a camera 15 connected thereto are connected to the base stand 2.

The microscope 1 can be operated in a transmission light illumination mode and in an incident-light illumination mode and also as a laser scanning microscope. Whereas the halogen lamp 8 on the transmission light arm 6, together with the condenser 7, serves the purpose of transmission light illumination of an object on the object stage 5, the mercury lamp 9, together with an objective in the objective turret 4, is part of a transmission light illumination. The laser 12 and the scanning module 10 enable operation of the microscope 1 as a laser scanning microscope.

The camera 15 serves to take images of the object.

The connection of these modules, which can be changed by a user, or of other modules to the microscope 1, i.e. to the base stand 2, to the transmission light arm 6 and/or to the binocular tube 3, is effected via ports.

For this purpose, the base stand 2 comprises a bottom port 16 pointing downwards, a front port 17 pointing to the front, a lateral port 18 and a rear port 19; the transmission light arm 6 comprises a port 20 pointing to the rear and the binocular tube 3 comprises a port 21 for connecting a TV camera. The ports in the base stand 2 and the binocular tube 3 are optically connected to each other via channels in the base stand 2 and the binocular tube 3, i.e. laser radiation entering the bottom port 16 can principally enter any of the other ports; however, the laser radiation may be attenuated as a function of the optical elements in the beam path. All ports except port 20 at the transmission light arm 6 comprise a stud which has a circumferential surface in the shape of a circular cylinder and which protrudes relative to the surface in which the respective port is arranged. These studs of the ports are each equal except for their lengths. The ports have mounting screws arranged therein by means of which modules can be mounted to the ports with dovetail rings. In the enlarged view of the rear port 19 in FIG. 1, the corresponding mounting screw is identified by reference numeral 22.

Whereas the bottom port 16 has the scanning module 10 connected to it, the front port 17 has the camera adapter 14 with the camera 15 connected to it, the rear port 19 has the mercury vapor lamp 9 connected to it, and the port 20 of the transmission light arm 6 has the halogen lamp 8 connected to it, the other parts are sealed by identically designed seals in the form of blind plugs 23, which also form modules in the sense of the invention. For the sake of clarity, FIG. 1 schematically shows only one blind plug 23.

A safety unit according to a preferred embodiment of the invention serves to protect a user from laser radiation of the laser 12 which unintentionally exits from the microscope 1, each port of said safety unit being provided with an attachment, an evaluating unit 24 connected to the attachments via signal links as well as counter pieces of said attachments. For the sake of clarity, the attachments and their counter pieces are shown only partly in FIG. 1.

Figure 2:
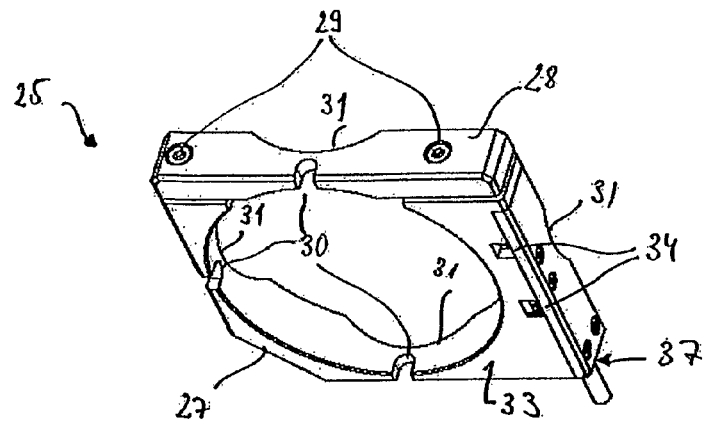
FIG. 2 shows a perspective representation of a first attachment according to a preferred embodiment of the invention on the microscope of FIG. 1.
Figure 3:
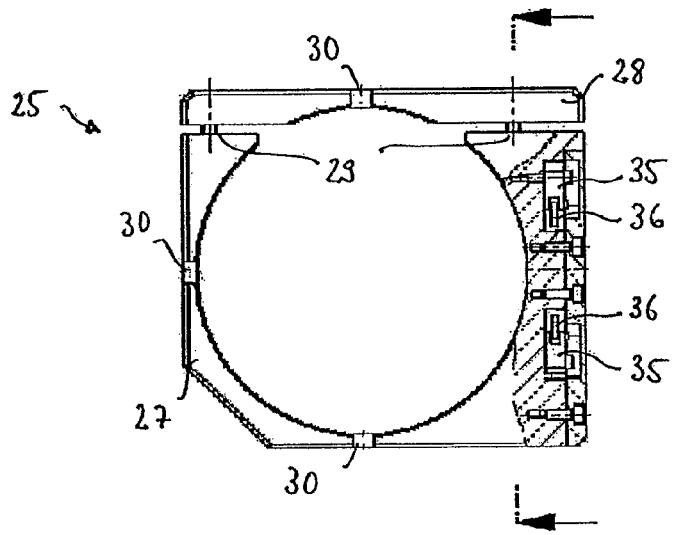
FIG. 3 shows a top view, partially cut in the region of feelers, of the first attachment in FIG. 2.
Figure 4:
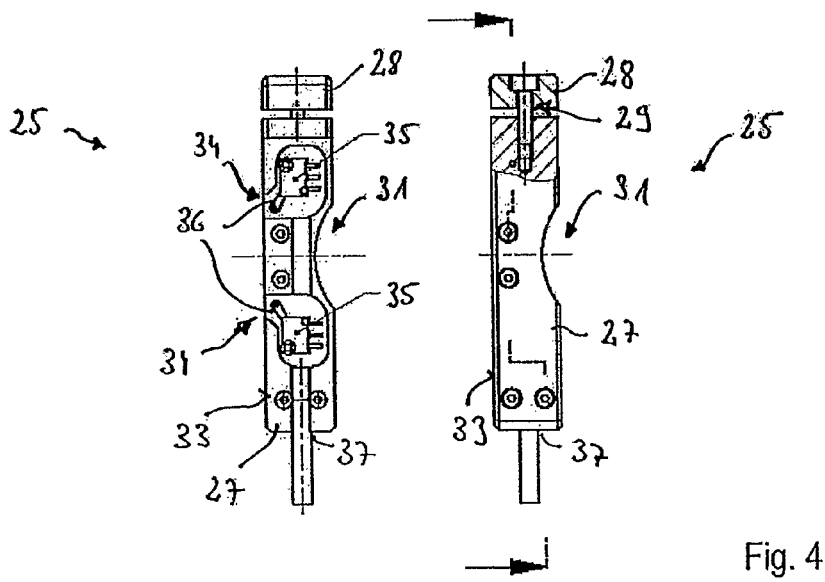
FIG. 4 shows two sectional views of the first attachment along planes of intersection which are orthogonal to a ring plane and of which the right one is intersected only in part.

FIGS. 2 to 4 show a first attachment 25, which is provided for use at a port comprising a stud, for example at the bottom port 16 comprising the stud 26.

The first attachment 25 comprises a ring segment 27 and a locking segment 28 in the form of a locking bracket which can be put together to form a ring segment. The ring segment 27 encloses a segment angle of more than 180°, but is open on one side. Its inner diameter corresponds to the outer diameter of the studs of the ports. The locking bracket 28 comprises a recess in the shape of a circular arc whose diameter corresponds to the inner diameter of the ring segment 27. Two screw connections 29 connect the free ends of the ring segment 27 and of the locking bracket 28.

The ring segment 27, together with the locking bracket 28 which is only loosely fixed thereto, can be placed as a ring element or as a retainer over the stud 26, e.g. of the bottom port 16. Thereupon, the screws of the two screw connections 29 can be tightened, the stud being clamped between the two segments if the locking segment 28 is suitably designed. Therefore, the ring segment 27, the locking segment 28 and the screw connections 29 form a mounting unit of the first attachment in the form of a clamping unit.

In order that the first attachment 25 can be attached to or detached from a port only during manufacture of the microscope 1 or only by a service engineer, the bolts for the screw connections 29 are encoded, for which purpose they comprise recesses in their heads having a non-symmetrical pentagonal cross-section, i.e. a pentagonal socket, as tool mounts. These tool mounts require suitable special tools for tightening or loosening the bolts, which tools are only available to the manufacturer of the microscope or to service engineers. Once attached to a stud of a port, an attachment can therefore be removed therefrom only by a service engineer using suitable tools, but not by a user of the microscope 1. Moreover, after mounting the first attachment 25 to a port, the screw connections are sealed by means of a conspicuous red lacquer so as to indicate that the screw connections must not be loosened.

The first attachment 25 is provided with three first U-shaped recesses 30 at an angle of 90° relative to each other, which are provided and arranged such that a mounting screw for mounting of a module by a dovetail ring, for example the mounting screw 22 shown in the detail of FIG. 1 which is an enlarged illustration of the rear port 19, can still be actuated when the first attachment 25 is mounted to the stud.

Opposite the first recesses 30, four circular arc-shaped second recesses 31 are provided, also at angular distances of 90°, which allow the use of the first attachments even at poorly accessible locations, such as the area of the rear port 19, for example, where an adjustment aid 32 extends transversely to the direction of the stud (not shown in FIG. 1) of the port 19, said adjustment aid 32 being partially enclosed by the first attachment 25 in the region of the second recesses 31.

In a contact surface 33 of the ring element 27, which contact surface extends parallel to the ring plane, two openings 34 are provided at a predetermined distance from each other, in which openings feelers 35 comprising actuating elements 36 are mounted flush so that the actuating elements 36 do not protrude from the contact surface 33, even if the feelers 35 have not been actuated. The feelers 35 are connected to connections 37 for a signal line to the evaluating unit 24 by lines not shown in FIGS. 2 to 4, with FIG. 1 showing only the signal line 38. In FIGS. 2 to 4 the sectional areas along which the partial sections extend are indicated by broken lines or by arrows, respectively.

Figure 5:
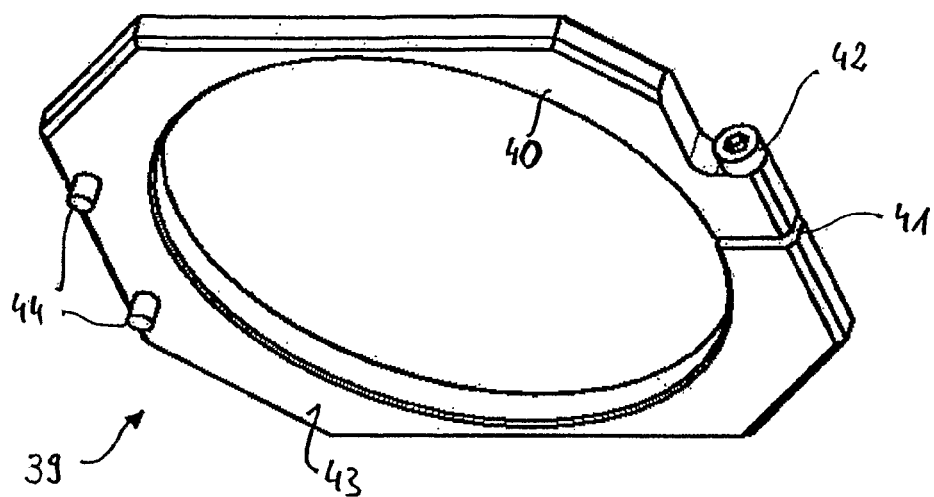
FIG. 5 shows a perspective view of a first counter piece according to a preferred embodiment of the invention for the first attachment in FIGS. 2 to 4.
Figure 6:
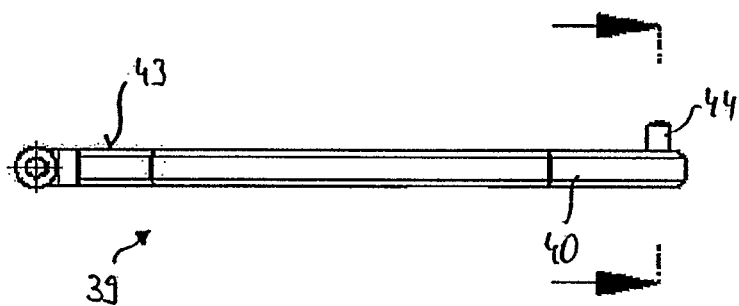
FIG. 6 shows a lateral view of the first counter piece in FIG. 5.
Figure 7:
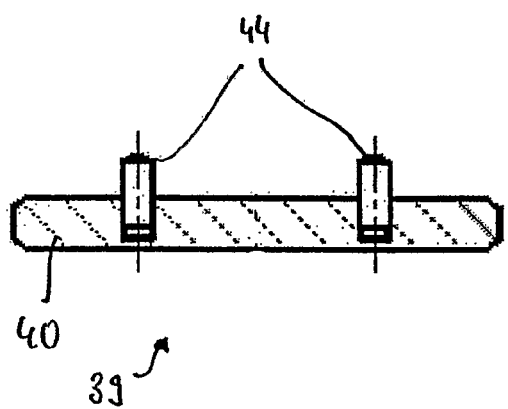
FIG. 7 shows a sectional view of the first counter piece in FIG. 6 along the plane indicated by the arrows in FIG. 5.

FIGS. 5 to 7 show a first counter piece 39 for the first attachment 25. The first counter piece 39 comprises a flat, ring-shaped basic body 40 which opens at a slot 41. The inner diameter of the basic body 40 corresponds to the outer diameter of the modules' connections. The free ends of the basic body 40 are connected transversely to the slot 41 by a screw 42 to form a retainer, so that the basic body 40 or the first counter piece 39, respectively, can be mounted, via a clamping connection, to a module's tubular stud which traverses the basic body 40.

A mating surface 43 of the first counter piece, extending parallel to the ring plane of the basic body 40 or of the first counter piece 39, respectively, and forming a mating surface for the contact surface 33 of the first attachment 25 and for the contact surfaces of other attachments to be described later, has metal pins 44 embedded therein with a mutual spacing corresponding to the spacing between the feelers 35 of the first attachment 25, said metal pins extending orthogonally to the mating surface 43. These metal pins protrude from the mating surface 43 to such an extent that, when the mating surface 43 of the first counter piece 39 contacts the contact surface 33 of the first attachment 25 in a suitable orientation, the metal pins 44 will enter the openings 34 and actuate the actuating elements 36 and, thus, the feelers 35 whose electrical condition will then change from non-conducting to conducting. Therefore, the metal pins 44 represent a specific embodiment of a protrusion of the first counter piece 39, which protrusion forms a identifying device. The metal pins 44 and the openings 34 or the feelers 35, respectively, are arranged such that the metal pins 44 can enter the openings 44 only if the module to which the counter piece 39 is mounted is correctly connected to a corresponding port including the first attachment 25 held thereon or any other corresponding attachment.

The arrangement of first counter pieces 39 on corresponding modules, namely the mercury vapor lamp 9 and the halogen lamp 8, is shown in detail in the magnified parts of FIG. 1.

Figure 8:
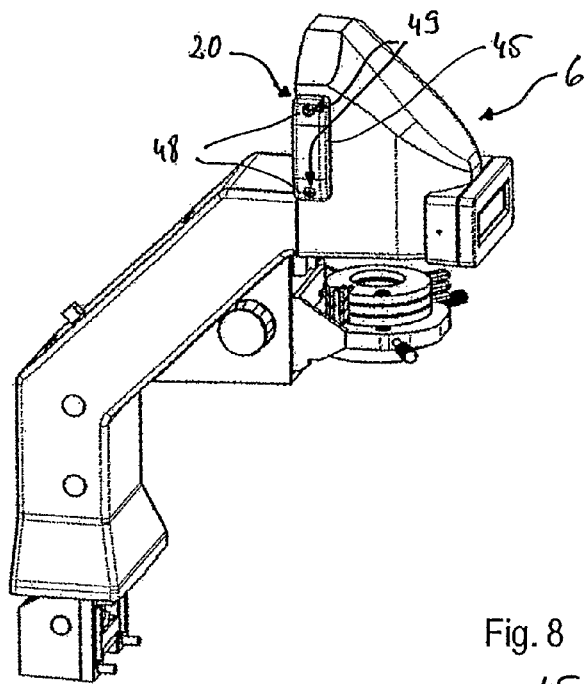
FIG. 8 shows a perspective view of a transmission light arm of the microscope in FIG. 1.
Figure 9:
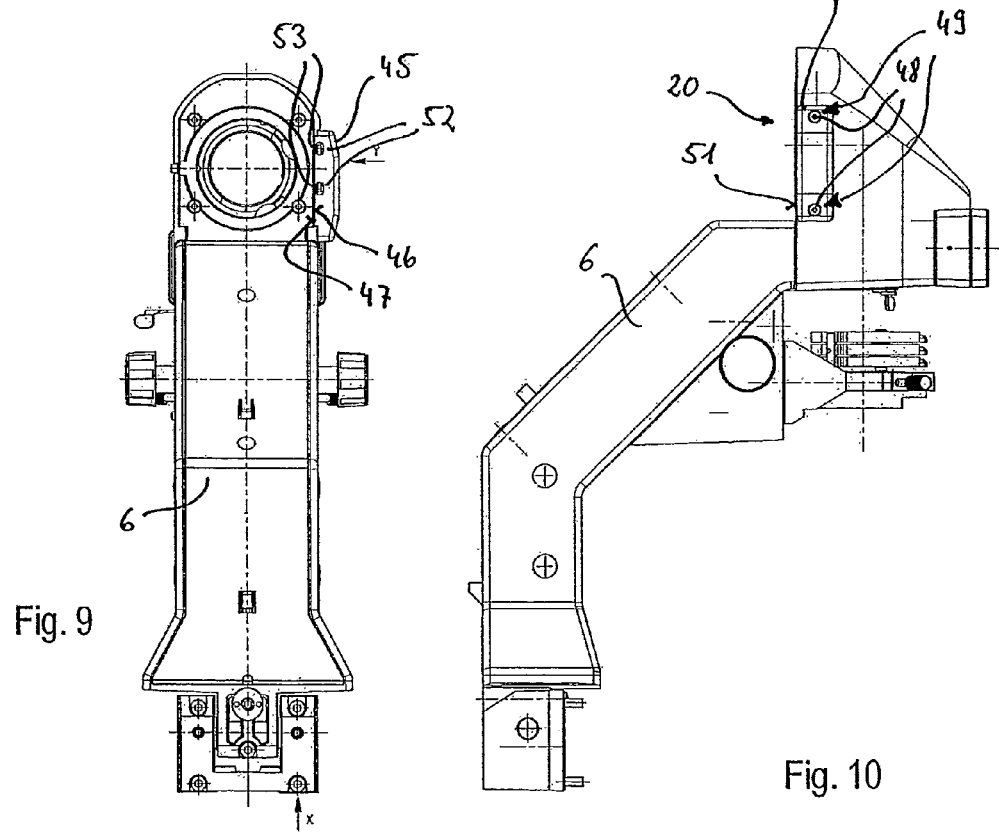
FIG. 9 shows a rear view of the transmission light arm of FIG. 8.
Figure 10:
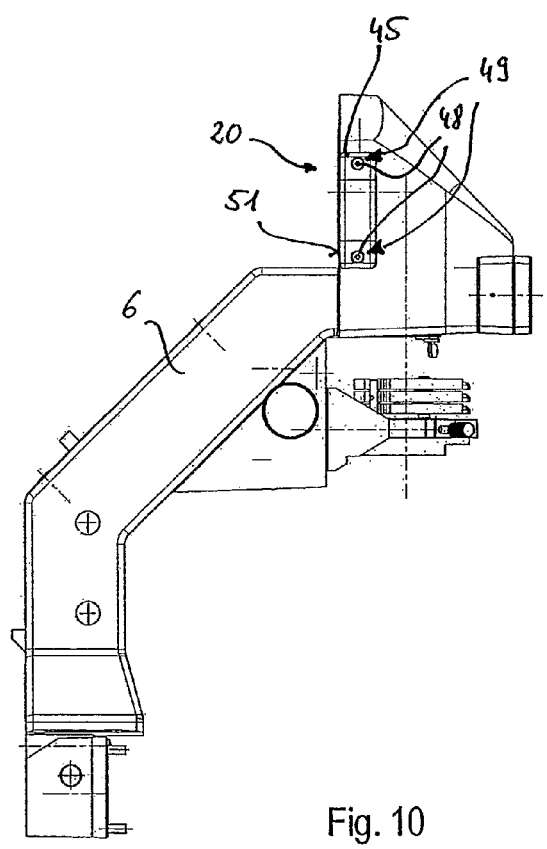
FIG. 10 shows a lateral view of the transmission light arm of FIG. 8.

A second attachment 45, which constitutes a second embodiment of attachments according to the invention, secures the port 20 to the transmission light arm 6, which is shown in more detail in FIGS. 8 to 10.

The port 20 is embedded in a head part of the transmission light arm 6 such that the corresponding surface of the transmission light arm 6 has no stud protruding from it to which a first attachment 25 could be mounted.

Therefore, in order to be mounted to a lateral surface of the transmission light arm 6, the second attachment 45 comprises a flat mounting surface 46 as a mounting unit in the region of the port 20, which mounting surface is firmly bonded to a mounting surface 47 of the transmission light arm, as well as screw holes 48 and bolts 49 which are encoded as in the case of the first attachment 25. The bolts 49 are screwed into threaded holes in the transmission light arm 6 and accordingly also enable alignment of the second attachment 45 relative to the transmission light arm 6 and, thus, to the port 20. If bolts are to be avoided, the second attachment 45 can also be connected to the mounting surface 47 on the side of the transmission light arm 6 by a firm bond, for example an adhesive bond.

A contact surface 51 of the second attachment 45 is in alignment with the face of the transmission light arm 6 in the region of the port 20. In the contact surface 51 two openings 52, having feelers 53 with actuating elements not shown in the Figures arranged therein, are arranged with the same spacing as in the first attachment 25. The feelers 53 are connected to connections, not shown in the Figures, for signal lines to the evaluating unit 24. The arrangement of the feelers 53 and of the actuating elements relative to the contact surface 51 corresponds exactly to that of the feelers 35 and of the actuating elements 36 of the first attachment 25, so that the feelers 53 serving as counter piece detecting sensors can be actuated by the first counter piece 39 in the same manner. This situation is partially depicted in the enlarged representation of the region of the port 20 in FIG. 1. The first counter piece 39 is held on a stud of the halogen lamp 8 and is in contact, via its mating surface 43, with the face of the transmitted light arm 6 in the region of the port 20 and thus with the contact surface 51, the metal pins 44 extending into the openings 52 and actuating the feelers 53 via the actuating elements.

Figure 11:
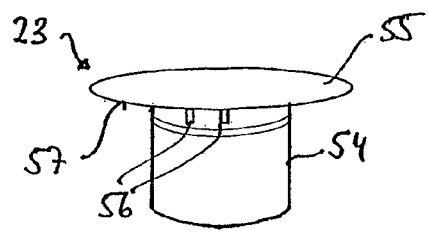
FIG. 11 shows a schematic perspective view of a blind plug for the microscope of FIG. 1.

FIG. 11 schematically shows the blind plug 23, which forms a seal for ports and, at the same time, constitutes a second embodiment of a counter piece for an attachment. The blind plug 23 comprises a short stud 54 with a dove-tail ring, shown only schematically, on a lid 55, whose outer diameter is selected such that it extends beyond the region of the openings of attachments in the region of the respective ports. Two metal pins 56 at the lower surface of the lid 55 are in turn held on a mating surface 57, said pins being arranged relative to one another and to the mating surface 57 in the same manner as the metal pins 44 of the first counter piece 39. When sealing a port with the blind plug 23 such that its mating surface 57 contacts a corresponding contact surface 33 or 51 of a first or second attachment 25 or 45, the metal pins 56 are located in the openings of the attachment and actuate feelers therein, when the blind plug 23 is suitably oriented relative to the attachment.

FIGS. 12 to 15 show a third embodiment of an attachment or a third attachment 58, respectively, which serves to secure an interface or a port to which a module is connected by means of a retainer nut.

The third attachment 58 comprises a U-shaped ring segment 59 and, articulated to a free end of the ring segment 59, a locking segment 60 in the form of a locking bracket which can be rotated back and forth between an opened position and a closed position. In the closed position, the free end of the locking segment 60 is connectable to the corresponding free end of the ring segment 59 by means of a screw 61, thus forming a ring element or retainer which receives a retainer nut 62.

The ring segment 59 has a U-shaped cross-section in a sectional plane perpendicular to the ring plane, which cross-section is selected such in connection with the internal diameter of the opening of the ring segment 59 in the ring plane that a positive lock is formed between the retainer nut 62 and the ring segment 59.

Two feelers 63 with actuating elements 64 are arranged as counter piece detecting sensors in the ring segment 59. The directions of actuation of the actuating elements or of the feelers 63, respectively, extend in a radial direction in the ring plane. The actuating elements 64 are arranged such that they can only be actuated by the retainer nut 62 as counter piece if the latter has been pushed far enough into the ring segment 59 and the ring segment 59 can be closed by the locking segment 60. The feelers 63 are connected, via lines not shown in the Figures, to connections 65 for connecting signal lines to the evaluating unit 24.

Figure 15:
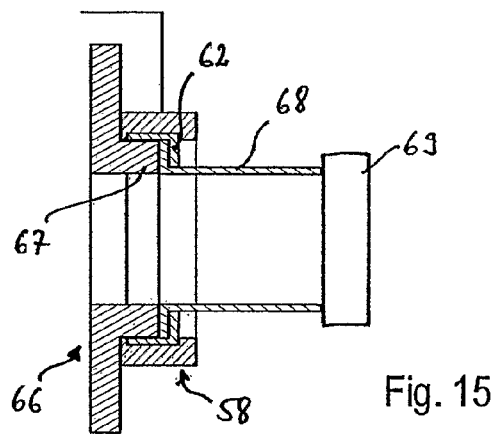
FIG. 15 shows a view of a section through a port and part of a module connected thereto including the third attachment of FIG. 12.

The securing of a port by the third attachment 58 is shown in more detail in FIG. 15. A stud 68 of a module 69, shown only schematically, is fitted onto a port 66 comprising a stud 67 with an external thread. The retainer nut 62 engages behind a flange of the stud 68, so that, when screwing the retainer nut 62 onto the external thread of the port 66, the module 69 is pulled towards said stud. The third attachment 58 encloses the retainer nut 62, which can no longer be loosened without changing the electrical condition of the counter piece detecting sensors 63 of the third attachment 58.

Figure 16:
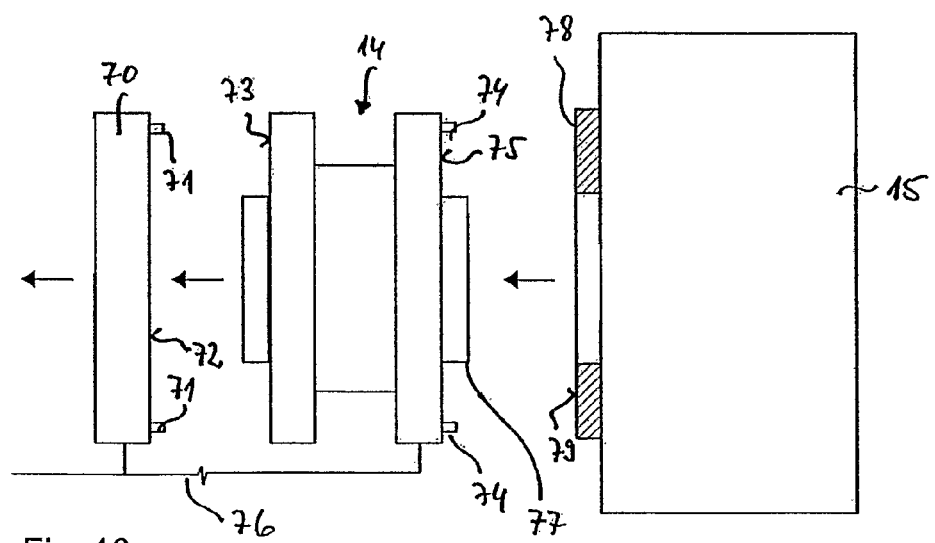
FIG. 16 shows a schematic sectional view of a port, a camera adapter and part of a camera of the microscope shown in FIG. 1.
Figure 12:
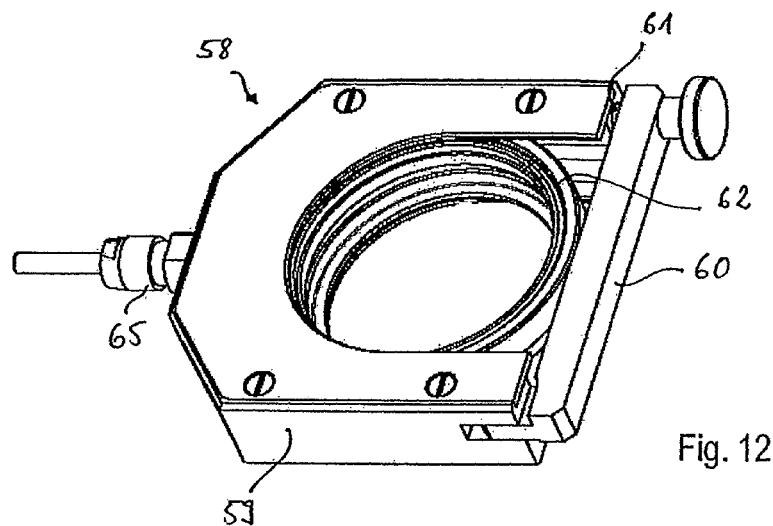
FIG. 12 shows a schematic perspective view of a third attachment comprising a retainer nut arranged therein.
Figure 13:
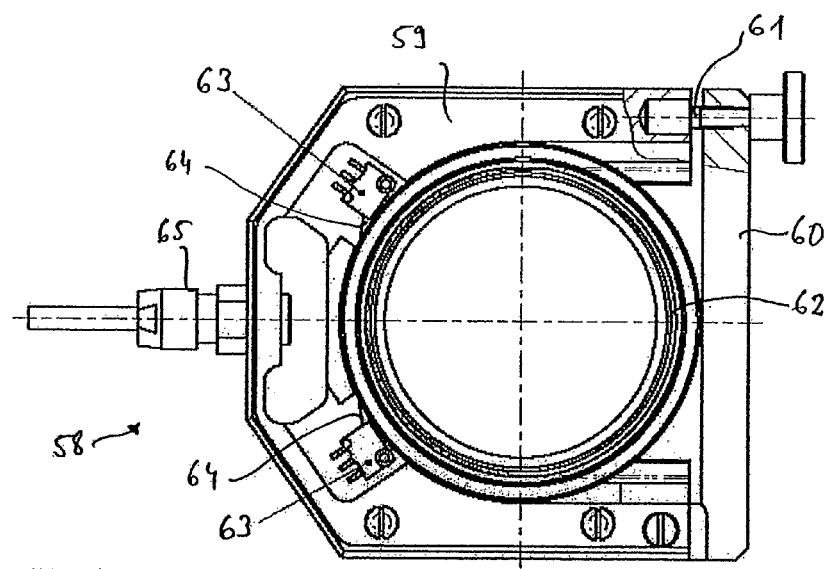
FIG. 13 shows a partly sectional top view of the third attachment of FIG. 12.
Figure 14:
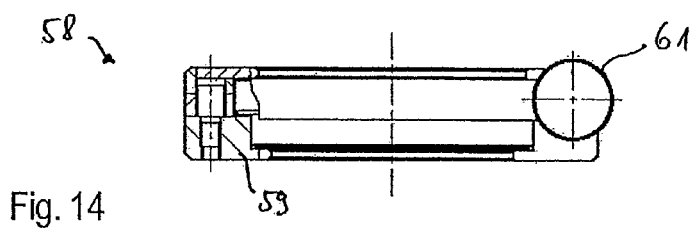
FIG. 14 shows a partly sectional lateral view of the third attachment of FIG. 12.

FIG. 16 shows fourth and fifth attachments which serve to connect the camera 15 in the example.

The fourth attachment 70 differs from the first attachment 25 in that the feelers comprising the actuating elements 71 are now arranged on opposite sides in a ring plane, said actuating elements 71 extending away from a contact surface 72.

The camera adapter 14, which can also be considered to be a module, also forms the fifth attachment and a counter piece to the fourth attachment 70.

A first flat, ring-shaped mating surface 73 serves as detecting means for the feelers of the fourth attachment 70 which serve as counter piece detecting sensors, said attachment 70 comprising the actuating elements which are actuated when mounting the camera adapter 14 to a port, not shown in the Figure, through the mating surface 73 by means of a thread, regardless of the rotary position, when the mating surface 73 contacts the contact surface 72.

The side of the camera adapter 14 located opposite the mating surface 73 is provided in the same manner as the fourth attachment 70 and comprises two feelers 74 with actuating elements which extend away from a contact surface 75. The feelers 74 are each connected to the evaluating unit 24 via signal lines 76 also in this case.

However, a camera stud 77 for connecting the camera 15 thereto protrudes from the center of the camera adapter 14 or from the contact surface 75. A third ring-shaped counter piece 78, which is held on the camera 15, actuates the feelers of the camera adapter 14, when a contact surface 79 of the counter piece 78 contacts the contact surface 75.

Figure 17:
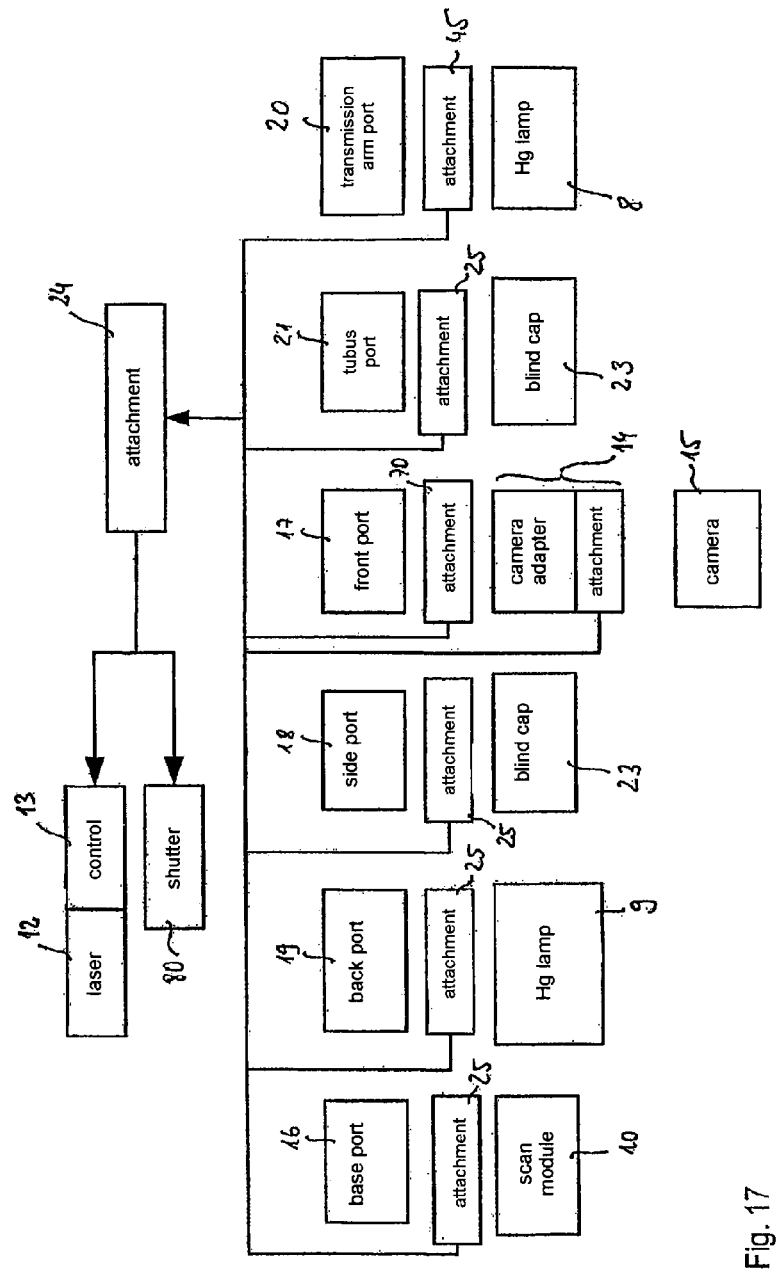
FIG. 17 shows a schematic view of an overall structure of a safety system for the laser radiation-guiding device of FIG. 1 and the connection of said safety system to a control unit for a laser and to an electrically operable shutter in the device.

FIG. 17 illustrates the overall structure of the safety system and its connection to the control unit 13 of the laser 12 and that of a laser radiation blocking unit in the form of an electrically operable shutter 80, which is arranged immediately following the light guide 11 in the beam path of the laser radiation in the scanning module 10.

Below the ports, FIG. 17 respectively shows the modules which are connected to the respective ports directly or via another module, for example in the form of an adapter, such as the camera adapter 14. The lines illustrate the signal links between the attachments at the ports and the evaluating unit 24. Said evaluating unit 24 comprises suitable interfaces for monitoring the electrical conditions of the attachment and, where applicable, emitting control signals to the control unit 13 and to the shutter 80, and a programmable microprocessor which is programmed to carry out a method for protecting a user of the laser radiation-guiding device or microscope 1 according to a preferred embodiment of the invention.

Each port has an attachment arranged at it. The electrical conditions of the counter piece detecting sensors of the attachments, i.e. of the attachments' feelers, are monitored by the evaluating unit 24. In doing so, the conditions of the counter piece detecting sensors of an attachment are jointly monitored so that the presence of a counter piece is detected only if both counter piece detecting sensors have the corresponding electrical condition. In the example, the evaluating unit 24 monitors whether both counter piece detecting sensors or feelers of all attachments are in an electrically conducting condition. If this is the case, a safe condition of the microscope 1 or of the ports, respectively, is recognized. However, if one of the counter piece detecting sensors is in a non-conducting condition, the evaluating unit 24 detects an unsafe condition of the port and emits a control signal to the control unit 13 which then switches off the laser 12. At the same time, the control signal is supplied to the shutter 80 which then blocks the beam path from the laser 12 or the light guide 11 into the scanning module 10 so that eye-damaging laser radiation cannot enter the region of the ports.

On a suitable display unit, the evaluating unit 24 can indicate at which of the ports an unsafe condition has been detected.

Figure 18:
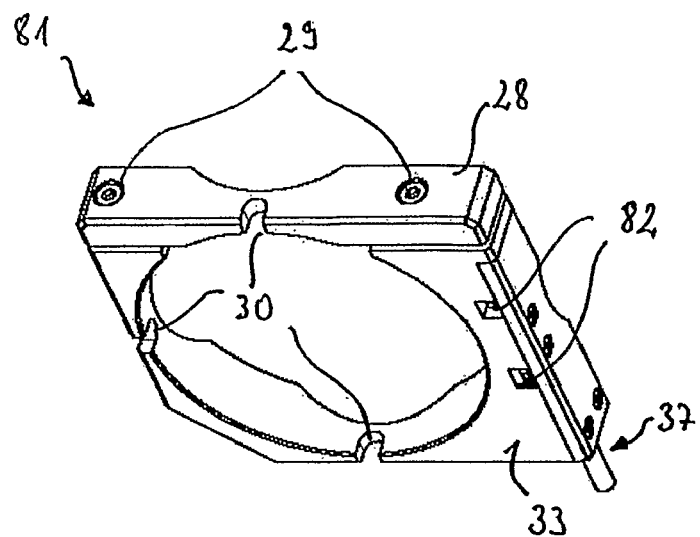
FIG. 18 shows a schematic perspective view of an attachment according to a sixth preferred embodiment of the invention.

In a further preferred embodiment of the safety system, use is also made of attachments 81 according to a sixth preferred embodiment of the invention, which are schematically shown in FIG. 18, said embodiment differing from the first attachments 25 of the first embodiment example in that, instead of feelers comprising actuating elements, Hall sensors 82, which are also sunk into corresponding openings, serve as counter piece detecting sensors.

Figure 19:
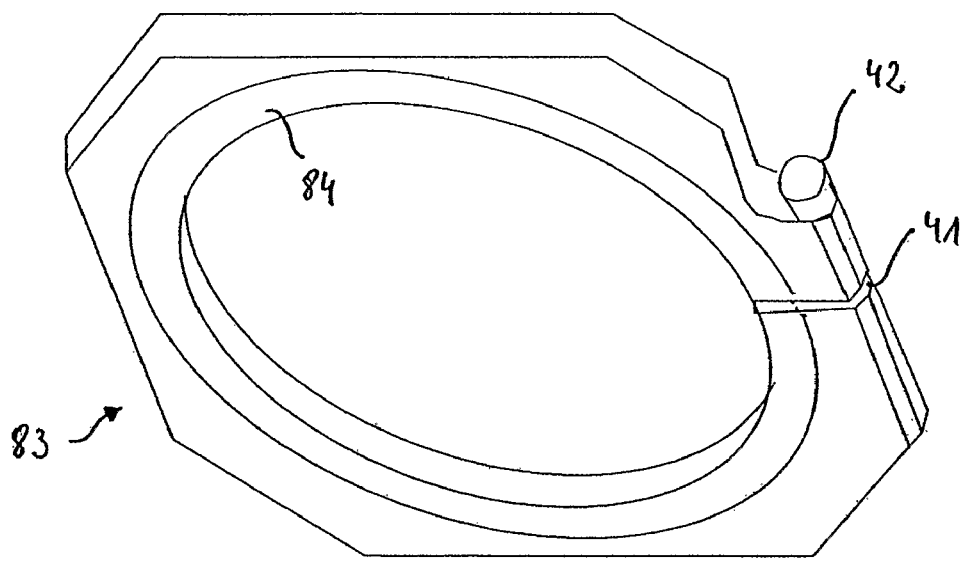
FIG. 19 shows a schematic perspective view of a counter piece for the attachment of FIG. 18 according to a further preferred embodiment of the invention.

Further, use is made of counter pieces 83 which are shown in FIG. 19 and correspond to the attachments 81 and which differ from the first counter pieces 39 in that, instead of the metal pins 44, ring-shaped magnets 84 are now embedded in the contact surfaces to form a identifying device which generates a Hall voltage in the Hall sensors 82, said voltage being detectable by the evaluating unit 24 and indicating the electrical condition of the counter piece detecting sensors.

The counter pieces 83 are freely rotatable relative to the attachments 81 in the respective ring plane so that a combination of the attachment 81 and a counter piece 83 is suitable to replace the third attachments 58. For this purpose, an attachment 81 can be mounted to a port and a corresponding counter piece 83 can be mounted to the retainer nut 62 of the module such that the counter piece 83 is detected when it contacts the attachment 81.

An attachment according to a further preferred embodiment of the invention differs from the first embodiment example in that the feelers are each replaced by two spring contacts arranged in the openings, which spring contacts can be short-circuited by the metal pins 44 of the first counter piece.

Figure 20:
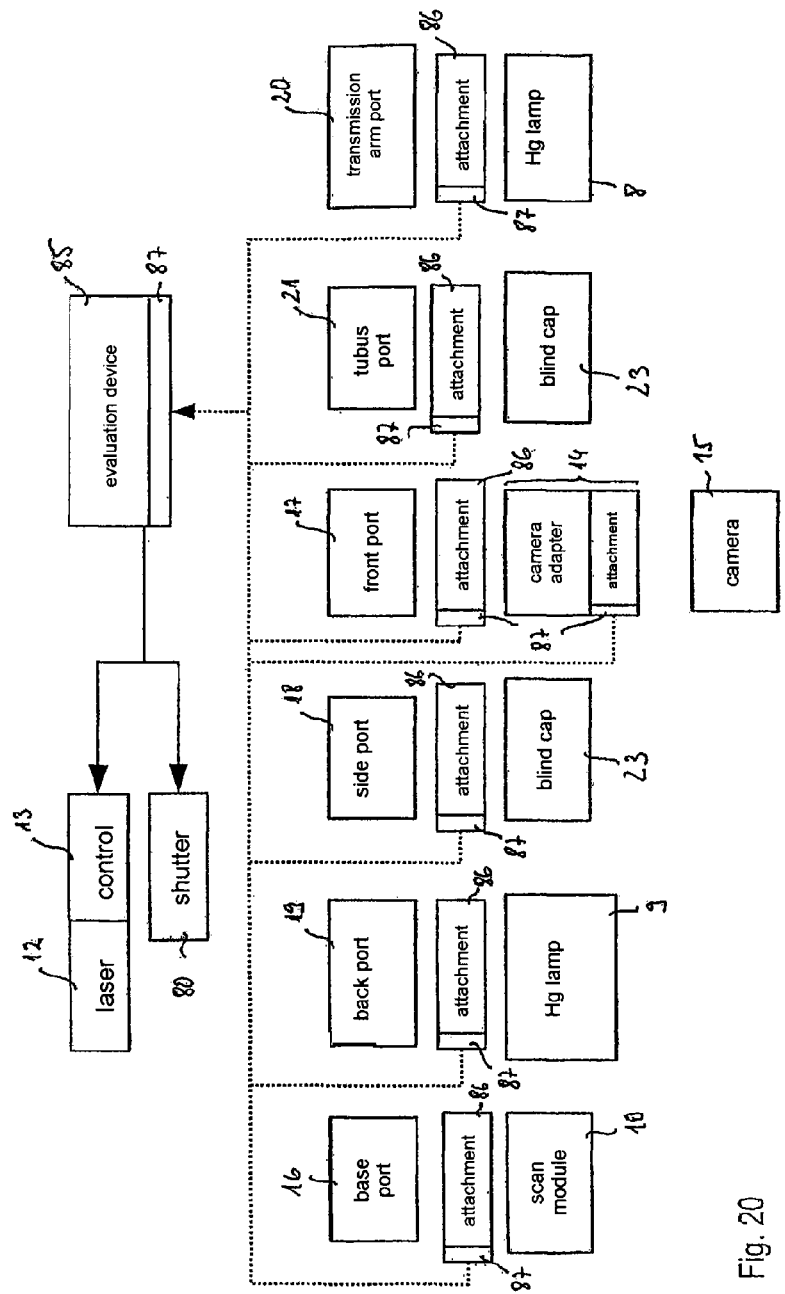
FIG. 20 shows a schematic view of an overall structure of a safety system for a laser radiation-guiding device according to a still further preferred embodiment and the connection of said safety system to a control unit for a laser and to an electrically operable shutter in the device.

In yet another preferred embodiment of the safety system according to the invention, as shown in FIG. 20, signal transmission between the counter piece detecting sensors or attachments and the evaluating unit is not effected by wire, but in a radio-assisted manner.

For this purpose, the evaluating unit 85 and the not necessarily identically designed attachments 86 respectively comprise a radio transmission and reception unit 87 according to the "bluetooth" standard. The radio transmission and reception unit 87 in one of the attachments is respectively connected to the counter piece detecting sensors of the attachment. Current can be supplied via sliding contacts at the ports.

Finally, counter piece detecting sensors can also be mounted directly to the microscope, at corresponding ports, such that they assume the function of the attachments' counter piece detecting sensors. For example, the attachment 45 at the transmission light arm 6 can be replaced by two counter piece detecting sensors in the form of feelers, which are embedded in the transmission light arm 6 above the port 20 and whose position relative to each other and to the port 20 is the same as that of the feelers 53 of the attachment 45, except for an anti-clockwise 90° rotation about the axis of the port 20.

In a further embodiment example, the counter pieces comprise RFID components and the attachments or the microscope itself comprise(s) an antenna and a transmission/reception unit, which is connected to said antenna and which allows to interrogate whether an RFID component is in at least one predetermined position relative to the antenna. The range of the electromagnetic radiation emitted by the transmission/reception unit or by the RFID component is preferably so short that detection occurs only if the distance between the RFID component and the antenna is below a predetermined maximum distance. The maximum distance is selected such that detection by a counter piece detecting sensor of the attachment or by a counter piece detecting sensor held directly on the microscope is effected only if the counter piece assumes a position, relative to the attachment or to the microscope, which excludes emission of eye-damaging radiation from the corresponding port.

The invention claimed is:

1. A safety system provided and adapted for fitting to a laser radiation-guiding device comprising at least one external port to attach a selected one of at least two separate modules, wherein the safety system comprises:
- at least one counter piece comprising an identifying device and a counter piece mounting unit for fitting the counter piece to the selected separate module or the external port,
- at least one attachment comprising:
  - an attachment mounting unit for fitting the attachment to the other one of the selected separate module and the external port, and
  - a counter piece detecting sensor,
- at least one evaluating unit connected to the attachment via a signal link, said evaluating unit detecting the electrical condition of the counter piece detecting sensor and, depending on the detected electrical condition, emitting a control signal to at least one of a control unit of a laser and a laser radiation-blocking device;
- wherein the identifying device influences the electrical condition of the counter piece detecting sensor of the attachment
- when the selected separate module or the external port is fitted with the counter piece and the other one of the selected separate module and the external port is fitted with the attachment, and
- when the identifying device of the counter piece is located within a maximum reach of the attachment and in a predetermined orientation relative to the attachment.

2. The safety system as claimed in claim 1, wherein the counter piece detecting sensor comprises a feeler, which can be actuated by at least one portion of the identifying device of the counter piece.

3. The safety system as claimed in claim 2, wherein the identifying device comprises at least one protrusion which actuates the feeler when the counter piece is located within the maximum reach of the attachment in the predetermined orientation relative to the attachment.

4. The safety system as claimed in claim 2, wherein the feeler comprises a free end and wherein the attachment comprises a recess, wherein the free end is sunk into the recess.

5. The safety system as claimed in claim 1, wherein the counter piece detecting sensor comprises two electric contacts and wherein the identifying device comprises an electrically conducting region adapted to short-circuit the two electric contacts when the counter piece is located within the maximum reach of the attachment and in the predetermined orientation relative to the attachment.

6. The safety system as claimed in claim 5, wherein the identifying device comprises at least one electrically conducting protrusion to short-circuit the electrical contacts of the counter piece detection sensor when the counter piece is located within the maximum reach of the attachment and in the predetermined orientation relative to the attachment.

7. The safety system as claimed in claim claim 1, wherein the counter piece detecting sensor comprises a Hall sensor responsive to magnetic fields.

8. The safety system as claimed in claim 7, wherein the identifying device comprises a magnet or a ring-shaped magnet.

9. The safety system as claimed in claim 1, wherein the counter piece detecting sensor is connected to a radio transmission unit via which a signal can be emitted which indicates the electrical condition of the counter piece detecting sensor.

10. The safety system as claimed in claim 1, wherein the attachment mounting unit comprises a surface for firm bonding to a predetermined surface of the laser radiation-guiding device or the selected module.

11. The safety system as claimed in claim 1, wherein the attachment mounting unit comprises a screwhole for a bolt and at least one of a bolt and a retainer with an encoded tool mount.

12. The safety system as claimed in claim 1, wherein the attachment mounting units comprise a clamping unit for clamping the attachment to the laser radiation-guiding device or to the selected module.

13. The safety system as claimed in claim 1, wherein the attachment encompasses a portion of the laser radiation-guiding device or of the selected separate module, when the attachment is mounted.

14. The safety system as claimed in claim 13, wherein the attachment mounting unit comprises a ring segment and a closure segment both comprising two free ends, wherein the closure segment is articulated with one of its free ends to one free end of the ring segment wherein the two segments form a ring element when assembled and fixed to each other at their other free ends.

15. The safety system as claimed in claim 1, wherein the identifying device comprises a mating surface and comprises a contact surface, wherein the mating surface and the contact surface are complementary to each other.

16. The safety system as claimed in claim 1, comprising two attachments wherein one of the two attachments is also provided as a counter piece for the other of the two attachments.

17. The safety system as claimed in claim 1, wherein the counter piece is provided as a seal for a port of the laser radiation-guiding device.

18. The safety system as claimed in claim 1, wherein the evaluating unit emits, as the control signal, a signal that switches off the laser or puts the laser radiation-blocking device into a condition blocking the laser radiation, when the counter piece detecting sensor does not sense a counter piece.

19. The safety system as claimed in claim 1, wherein the attachment comprises a radio transmission unit connected to the counter piece detecting sensor and wherein the evaluating unit comprises a radio reception unit so that the signal link between the attachment and the evaluating unit is radio-based.

20. The safety system as claimed in claim 1, wherein the safety system is provided and adapted for the laser radiation-guiding device being a laser radiation-guiding microscope.

* * * * *

UNITED STATES PATENT AND TRADEMARK OFFICE
CERTIFICATE OF CORRECTION

PATENT NO. : 8,004,757 B2
APPLICATION NO. : 11/664448
DATED : August 23, 2011
INVENTOR(S) : Andreas Nolte et al.

It is certified that error appears in the above-identified patent and that said Letters Patent is hereby corrected as shown below:

- On the Title Page, Item (75), the name of the city of inventor Mr. Andreas Nolte to be corrected from "Mengershausen" to --Rosdorf/OT Lemshausen--.

- On the Title Page, Item (75), the name of the city of inventor Mr. Hubert Wahl to be corrected from "Stradtrode" to --Stadtroda--.

- On the Title Page, Item (73), the name of the Assignee "Carl Zeiss Microimaging GmbH" corrected to --Carl Zeiss MicroImaging GmbH--.

- In column 2, line 26, column 15, line 14 and column 18, line 7 it should read "an identifying device" (instead of "a identifying device");

- In column 3, lines 38-39 and line 45 it should read "counter piece detecting sensor" (instead of "counter piece sensor");

- In column 5, line 25-26 it should read "identifying device" (instead of "identifying devices");

- In column 7, lines 54-55 it should read "Radio Frequency Identification Device (RFID)" (instead of RFID tag");

- In column 7, line 67 it should read "counter piece detecting sensor" (instead of "sensors"); and

- In column 19, line 54 it should read "...as claimed in claim 1" (instead of "...as claimed in claim claim 1").

Signed and Sealed this
Tenth Day of July, 2012

David J. Kappos
*Director of the United States Patent and Trademark Office*